United States Patent
Kim et al.

(10) Patent No.: US 11,097,963 B2
(45) Date of Patent: Aug. 24, 2021

(54) METHOD FOR TREATING SOLVENT IN WASTEWATER

(71) Applicants: LG CHEM, LTD., Seoul (KR); SepraTek Inc., Daejeon (KR)

(72) Inventors: Youna Kim, Daejeon (KR); Dong Kwon Lee, Daejeon (KR); Jeong Seok Lee, Daejeon (KR); Kwang Hyon Kim, Daejeon (KR); Choongkyun Yeom, Daejeon (KR); Seok Ki Kang, Daejeon (KR); Kyehoon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 315 days.

(21) Appl. No.: 16/306,415

(22) PCT Filed: Dec. 22, 2017

(86) PCT No.: PCT/KR2017/015379
§ 371 (c)(1),
(2) Date: Nov. 30, 2018

(87) PCT Pub. No.: WO2018/124663
PCT Pub. Date: Jul. 5, 2018

(65) Prior Publication Data
US 2020/0317540 A1    Oct. 8, 2020

(30) Foreign Application Priority Data
Dec. 26, 2016    (KR) .......................... 10-2016-0179502

(51) Int. Cl.
*B01D 61/36*    (2006.01)
*B01D 69/10*    (2006.01)
(Continued)

(52) U.S. Cl.
CPC ............ *C02F 1/447* (2013.01); *B01D 61/364* (2013.01); *B01D 69/02* (2013.01); *B01D 69/10* (2013.01);
(Continued)

(58) Field of Classification Search
CPC .... C02F 1/447; C02F 2101/32; C08G 64/406; B01D 61/364
See application file for complete search history.

(56) References Cited

U.S. PATENT DOCUMENTS

| 4,553,983 A | 11/1985 | Baker |
| 6,153,097 A * | 11/2000 | Jensvold ............... B01D 63/026 210/321.79 |

(Continued)

FOREIGN PATENT DOCUMENTS

| CN | 103640108 A * | 3/2014 |
| CN | 10-4857742 A | 8/2015 |

(Continued)

OTHER PUBLICATIONS

Banat, Fawzi Ahmed. "Membrane Distillation For Desalination And Removal o f Volatile Organic Compounds From Water." Mcgill University, Canada (1994). (Year: 1994).*

(Continued)

*Primary Examiner* — Bradley R Spies
(74) *Attorney, Agent, or Firm* — Dentons US LLP

(57) ABSTRACT

The present disclosure relates to a method for treating a solvent in wastewater generated in a polycarbonate production process. More specifically, the present disclosure relates to a method for treating a solvent in wastewater generated in a polycarbonate production process, which can easily recover a high purity solvent regardless of the concentration of the solvent by using a membrane distillation method to reuse it, and contribute to energy savings.

13 Claims, 4 Drawing Sheets

(51) Int. Cl.
*B01D 71/26* (2006.01)
*B01D 71/36* (2006.01)
*C02F 1/44* (2006.01)
*C08G 64/40* (2006.01)
*B01D 69/02* (2006.01)
*C02F 1/04* (2006.01)
*C02F 101/32* (2006.01)
*C02F 101/36* (2006.01)
*C02F 103/38* (2006.01)

(52) U.S. Cl.
CPC .............. *B01D 71/26* (2013.01); *B01D 71/36* (2013.01); *C02F 1/04* (2013.01); *C08G 64/406* (2013.01); *B01D 2325/38* (2013.01); *C02F 2101/32* (2013.01); *C02F 2101/36* (2013.01); *C02F 2103/38* (2013.01)

(56) References Cited

U.S. PATENT DOCUMENTS

| | | | |
|---|---|---|---|
| 9,039,900 | B2 | 5/2015 | Mitra et al. |
| 2010/0324256 | A1 | 12/2010 | Ooms et al. |
| 2016/0038879 | A1 | 2/2016 | Yamaguchi et al. |
| 2016/0338879 | A1 | 11/2016 | Zhao et al. |

FOREIGN PATENT DOCUMENTS

| | | |
|---|---|---|
| JP | 03-11806 B2 | 2/1991 |
| JP | 06-200006 A | 7/1994 |
| JP | 2011-167599 A | 9/2011 |
| KR | 10-0249259 A | 4/2000 |
| KR | 2001-0081325 A | 8/2011 |
| KR | 2014-0145885 A | 12/2014 |
| KR | 10-1632771 B1 | 6/2016 |
| KR | 10-1650610 B1 | 8/2016 |
| KR | 2016-0123822 A | 10/2016 |
| WO | 2012/116409 A1 | 9/2012 |
| WO | 2016-054643 A1 | 4/2016 |

OTHER PUBLICATIONS

Li Xiaoli et al—CN 103640108 A Machine Translation—2014 (Year: 2014).*
Kuroki, Takashi et al—JP H06-200006 A Machine Translation—1994 (Year: 1994).*

* cited by examiner

[FIG. 1]
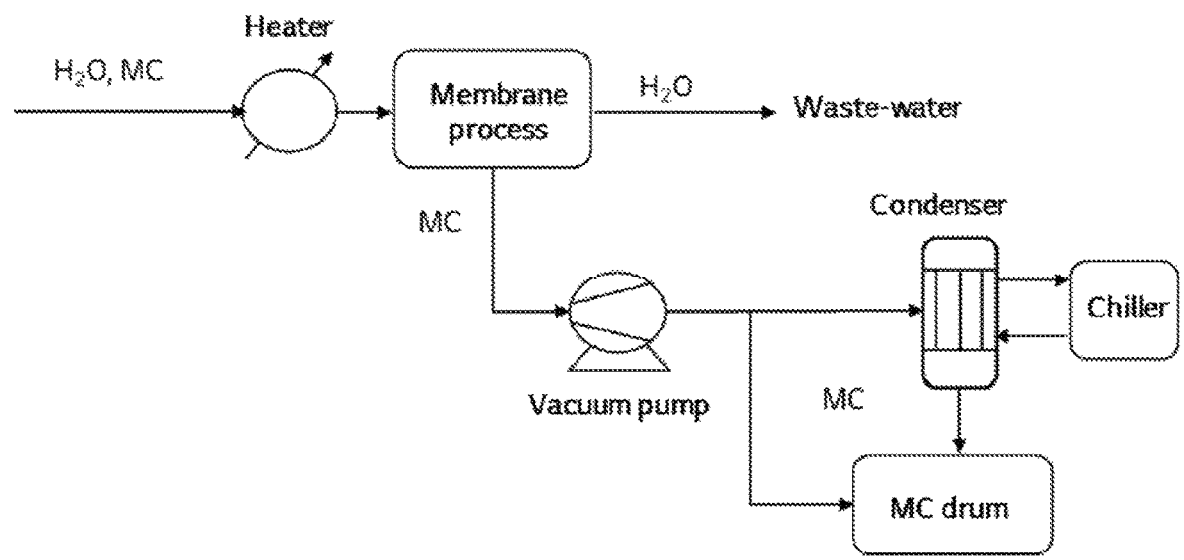
[FIG. 2]
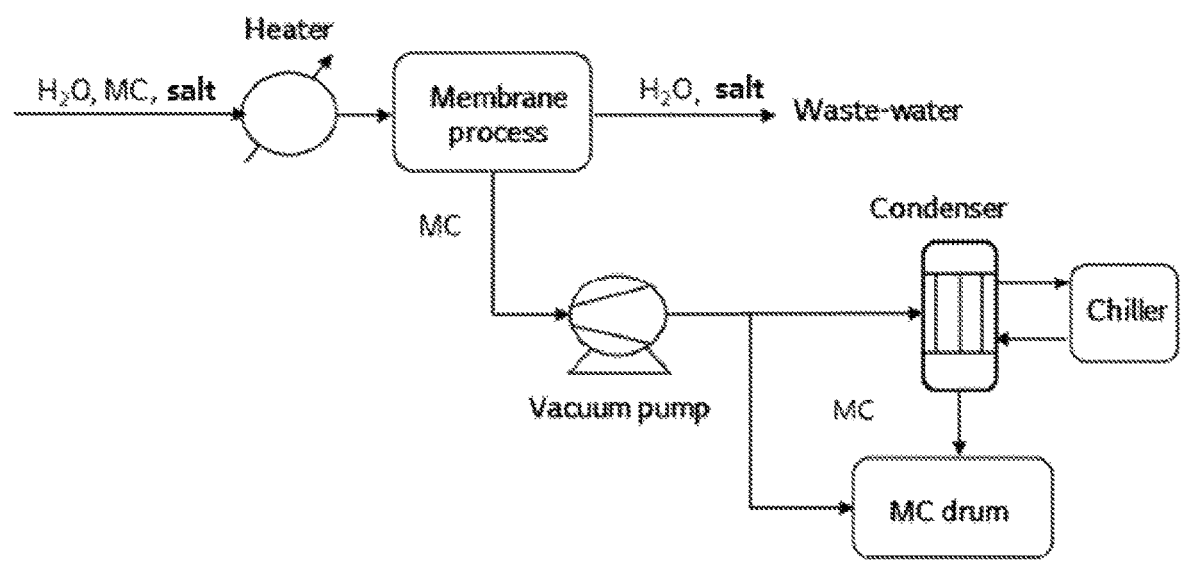

[FIG. 3]
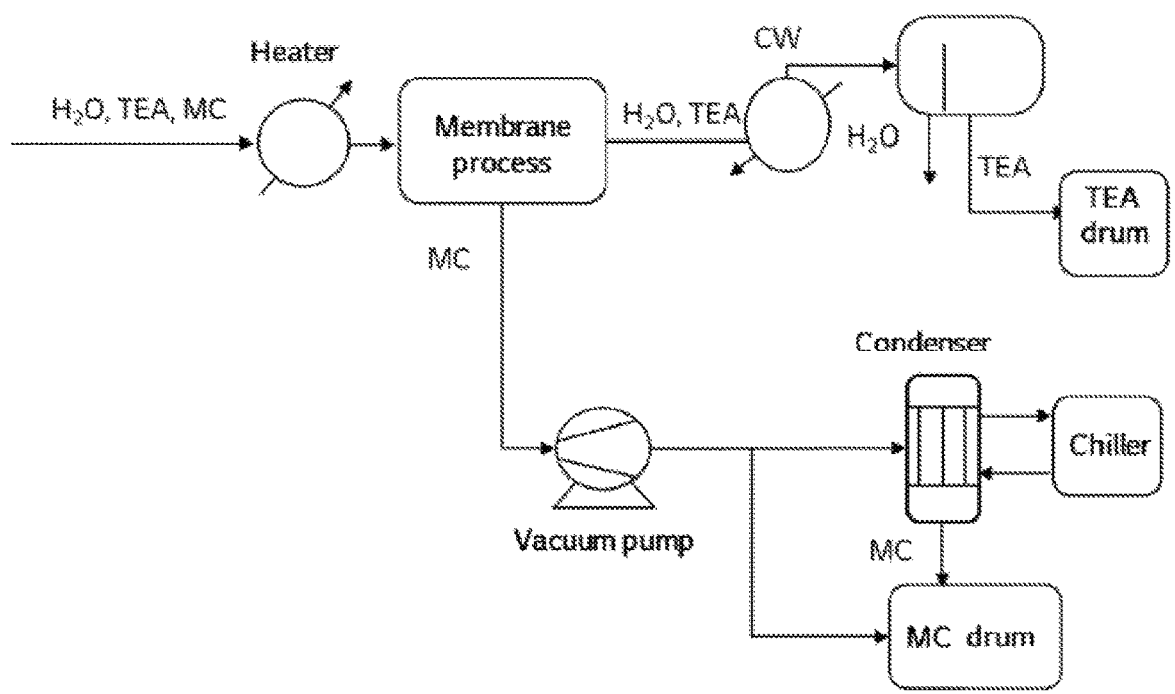

[FIG. 4]
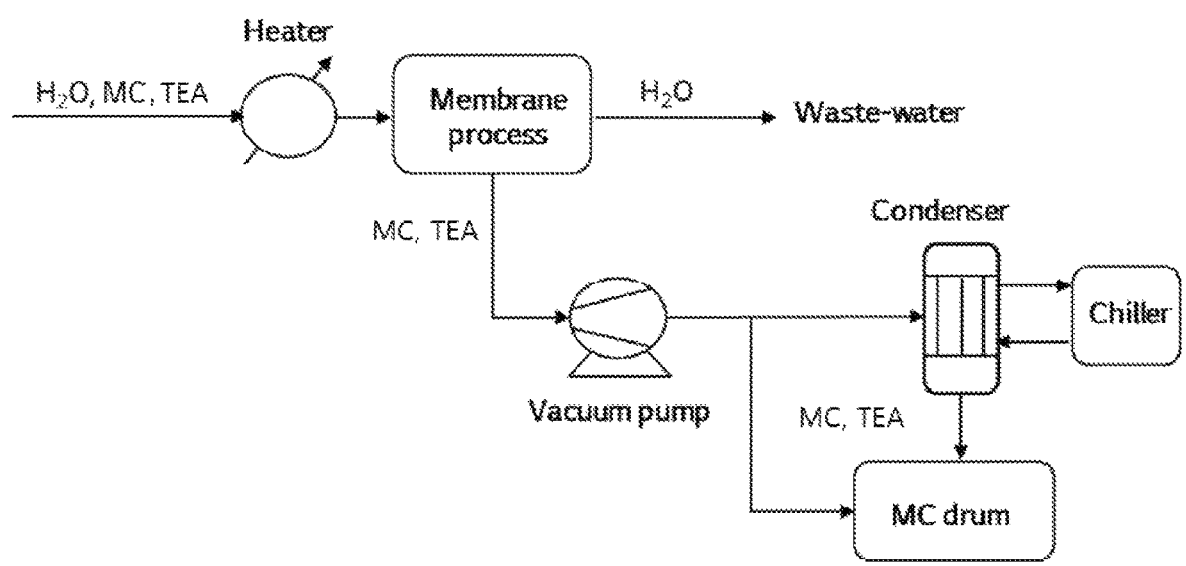

【FIG. 5】
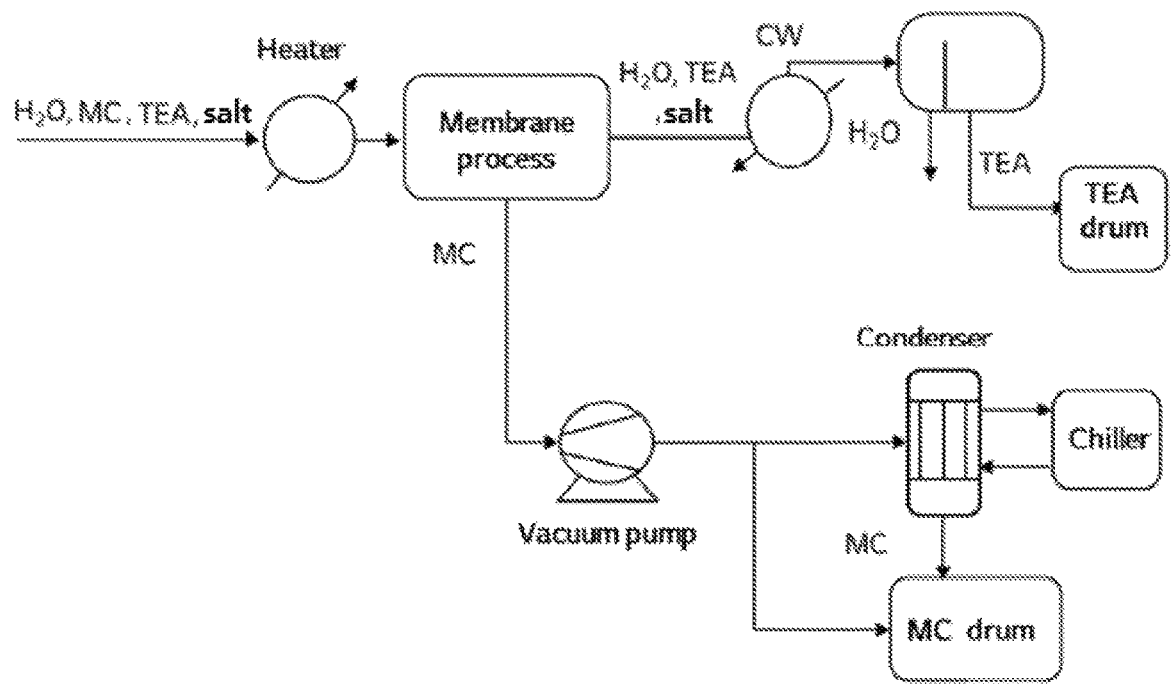
【FIG. 6】
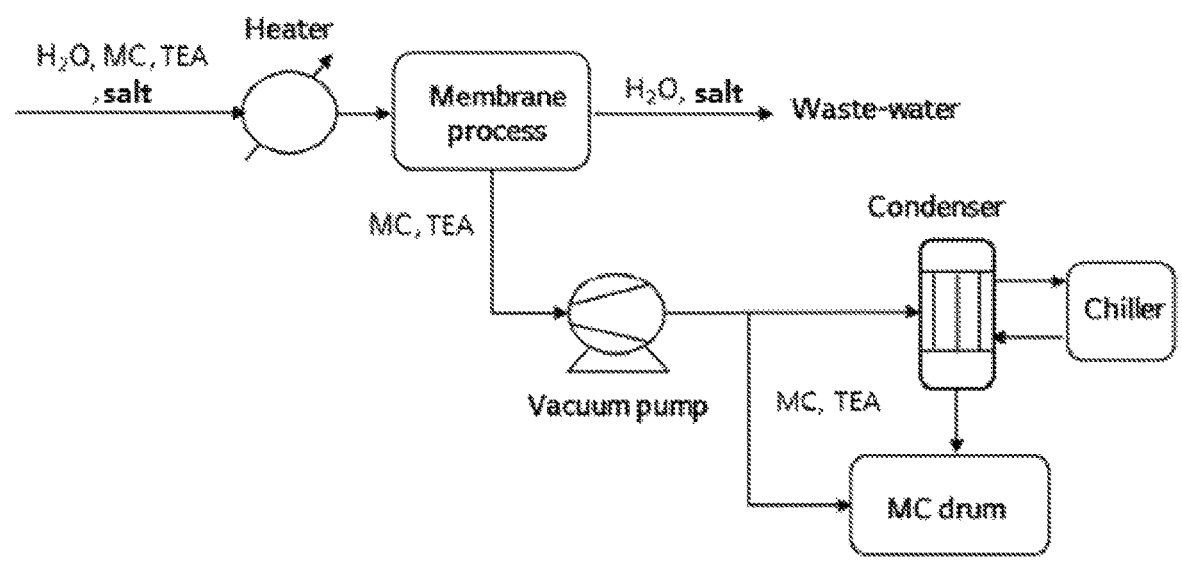

METHOD FOR TREATING SOLVENT IN WASTEWATER

TECHNICAL FIELD

Cross-Reference to Related Application

This application is a National Stage Entry of International Application No. PCT/KR2017/015379 filed on Dec. 22, 2017, and claims the benefit of and priority to Korean Application No. 10-2016-0179502, filed on Dec. 26, 2016, all of which are hereby incorporated by reference in their entirety for all purposes as if fully set forth herein.

The present disclosure relates to a method for treating a solvent in wastewater generated in a polycarbonate production process, which can recover a high purity solvent by using a membrane distillation method to reuse it, and contribute to energy savings.

BACKGROUND OF ART

Polycarbonate is one of engineering plastics and is widely used in the plastics industry. The polycarbonate is excellent in transparency, impact resistance, mechanical strength, heat resistance, and the like, and is applied to a wide range of fields such as a transparent sheet, an automobile bumper, an optical disk, and the like.

The polycarbonate is usually prepared by a method of reacting a divalent hydroxy compound with phosgene, or by an exchange method of reacting a divalent hydroxy compound with a carbonic acid diester.

In the polycarbonate products prepared by the above two methods, impurities
exist as well as the desired polycarbonate. For example, the impurities are an organic solvent commonly used for producing a polycarbonate such as methylene chloride ($CH_2Cl_2$), a catalyst component such as triethylamine, and a salt component such as sodium chloride and sodium carbonate.

The polycarbonate production process is roughly divided into a polymerization process and a post-treatment process. In the post-treatment process, a purification process for removing unreacted residual monomers and impurities other than the polycarbonate, and a drying and molding process, are included.

Herein, methylene chloride is an organic solvent which is used in a large amount in the polycarbonate production process.

The polymerized polycarbonate solution contains abundant amounts of used catalysts such as TEA, salts, and other impurities. Thus, there is a need for a washing process to remove catalysts such as TEA, salts, and other impurities contained in the polycarbonate solution. This washing process uses a large amount of water, generating a large amount of wastewater containing catalysts such as TEA, salts, and other impurities, and also methylene chloride. In addition, in the drying step of the polycarbonate, nitrogen is used. In a process for regenerating nitrogen gas (using an adsorption tower, a scrubber, a water removal tower, or the like) by removing the solvent (for example, methylene chloride or methylene chloride/water) contained in the nitrogen gas used after drying, a large amount of wastewater containing methylene chloride is also generated.

Since the methylene chloride is a toxic volatile material, when the wastewater is released in the presence of the methylene chloride and exposed to the human body, it is known that it may cause growth deterioration or cancer, which is very dangerous. In addition, when methylene chloride is contained in wastewater and released, methylene chloride, which can be reused in the process, is lost, which may cause economic problems.

Accordingly, a method for recovering the solvent such as methylene chloride in wastewater is required, and various methods are being studied. For example, Korean Patent Publication No. 2014-0145885 discloses a method for producing a polycarbonate including a step of purifying a dichloromethane solvent with a distillation column. Also, U.S. Pat. No. 9,039,900 discloses a method for extracting a catalyst and ions after separating product mixtures at low shear rates.

However, these methods have some problems in that a recovery rate of the solvent in wastewater is low and energy is excessively consumed.

Although processes for separating and recovering the methylene chloride in wastewater are conventionally known, there are some problems that the methods known to date have high energy consumption and a low recovery rate depending on the methylene chloride concentration.

DETAILED DESCRIPTION OF THE INVENTION

Technical Problem

The present disclosure is to provide a method for treating a solvent in wastewater generated in a polycarbonate production process, which can recover the solvent from the wastewater generated in the polycarbonate production process by a membrane distillation method at a high yield regardless of the concentration of the solvent. In particular, the method is economical since the energy consumption is not high, and does not generate a large amount of wastewater.

Technical Solution

The present disclosure provides a method for treating a solvent in wastewater, including the steps of:

a) preparing wastewater containing water, and a solvent in a vapor state and a liquid state generated in a polycarbonate production process;

b) separating the solvent by a membrane distillation method in which the wastewater is supplied to a separation membrane column having a hydrophobic porous support membrane to separate only the solvent in a vapor state of the wastewater through pores of the hydrophobic porous support membrane and transfer it to a condenser;

c) condensing the separated solvent by using the condenser; and d) transferring the condensed solvent to a solvent reservoir.

The wastewater of the step a) may further contain a salt, a catalytic material, or a salt and a catalytic material.

When the wastewater of the step a) further contains a salt, the step of separating the solvent by a membrane distillation method may include supplying wastewater containing water, a salt, and a solvent in a vapor state and a liquid state to a separation membrane column having a hydrophobic porous support membrane to separate only the solvent in a vapor state of the wastewater to one side through pores of the hydrophobic porous support membrane and transfer it to a condenser.

When the wastewater of the step a) further contains a catalytic material, the step of separating the solvent by a membrane distillation method may include supplying wastewater containing water, a catalytic material, and a solvent in a vapor state and a liquid state to a separation membrane column having a hydrophobic porous support membrane to separate only the solvent in a vapor state of the wastewater to one side through pores of the hydrophobic porous support membrane and transfer it to a condenser.

When the wastewater of the step a) further contains a catalytic material, the step of separating the solvent by a membrane distillation method may include supplying wastewater containing water, a catalytic material, and a solvent in a vapor state and a liquid state to a separation membrane column having a hydrophobic porous support membrane to separate the catalytic material and the solvent in a vapor state of the wastewater to one side through pores of the hydrophobic porous support membrane and transfer them to a condenser.

When the wastewater of the step a) further contains a catalytic material, the step of separating the solvent by a membrane distillation method may include supplying wastewater containing water, a catalytic material, and a solvent in a vapor state and a liquid state to a separation membrane column having a hydrophobic porous support membrane to separate only 20 wt % to 90 wt % of the catalytic material, based on the weight of the total catalyst contained in wastewater, together with the solvent in a vapor state to one side through pores of the hydrophobic porous support membrane and transfer them to a condenser.

When the wastewater of the step a) further contains a salt and a catalytic material, the step of separating the solvent by a membrane distillation method may include supplying wastewater containing water, a salt, a catalytic material, and a solvent in a vapor state and a liquid state to a separation membrane column having a hydrophobic porous support membrane to separate the catalytic material and the solvent in a vapor state of the wastewater to one side through pores of the hydrophobic porous support membrane and transfer them to a condenser.

When the wastewater of the step a) further contains a salt and a catalytic material, the step of separating the solvent by a membrane distillation method may include supplying wastewater containing water, a salt, a catalytic material, and a solvent in a vapor state and a liquid state to a separation membrane column having a hydrophobic porous support membrane to separate only the solvent in a vapor state of the wastewater to one side through pores of the hydrophobic porous support membrane and transfer it to a condenser.

The hydrophobic porous support membrane preferably has pores of a 0.1 μm to 1 μm size.

The hydrophobic porous support membrane is preferably formed of polypropylene, polyethylene, polytetrafluoroethylene (PTFE), or a hydrophobic polymer material in which polypropylene is combined with Teflon.

The solvent may be methylene chloride ($CH_2Cl_2$), 1,2-dichloroethane ($ClCH_2CH_2Cl$), chlorobenzene ($C_6H_5Cl$), or toluene ($C_7H_8$).

In the step a), the wastewater may be generated in the step of purifying the polycarbonate or regenerating nitrogen gas used for drying the polycarbonate after the completion of drying.

The step b) may further include heating the wastewater before supplying it to the hydrophobic porous support membrane.

In the step b), the remaining wastewater not separated through the hydrophobic porous support membrane may remain on the other side of the hydrophobic porous support membrane, and then may be discharged through a transfer line connected to a side of the separation membrane column.

The solvent separated in the step c) may be recovered and reused in the polycarbonate production process.

The wastewater may further contain a catalyst, a salt, and an additive used in a polycarbonate production process.

In addition, the method of the present disclosure preferably uses a treatment apparatus including:

a heater for heating the wastewater containing water, and a solvent in a vapor state and a liquid state generated in a polycarbonate production process;

a separation membrane column having a hydrophobic porous support membrane for separating only the solvent in a vapor state of the wastewater heated by the heater;

a condenser equipped with a chiller for condensing the solvent separated from the separation membrane;

a solvent reservoir for recovering the solvent separated from the condenser; and a vacuum pump for recovering or circulating the solvent.

Advantageous Effects

The present disclosure can effectively separate and recover a solvent in liquid wastewater using a membrane distillation method by liquefying the solvent in nitrogen gas of the wastewater generated in a purification or drying process of the polycarbonate production process. In addition, since the recovered solvent can be reused in the polycarbonate production process, it is possible to reduce costs. Also, the efficiency is excellent, because the solvent can be recovered at a high yield without any additional pressure even with low energy consumption compared with other separation methods.

BRIEF DESCRIPTION OF THE DRAWINGS

FIG. 1 is a schematic view illustrating a method for treating a solvent in wastewater generated in a polycarbonate production process according to the first preferred embodiment of the present disclosure.

FIG. 2 is a schematic view illustrating a method for treating a solvent in wastewater generated in a polycarbonate production process according to the second preferred embodiment of the present disclosure.

FIG. 3 is a schematic view illustrating a method for treating a solvent in wastewater generated in a polycarbonate production process according to the third preferred embodiment of the present disclosure.

FIG. 4 is a schematic view illustrating a method for treating a solvent in wastewater generated in a polycarbonate production process according to the fourth preferred embodiment of the present disclosure.

FIG. 5 is a schematic view illustrating a method for treating a solvent in wastewater generated in a polycarbonate production process according to the fifth preferred embodiment of the present disclosure.

FIG. 6 is a schematic view illustrating a method for treating a solvent in wastewater generated in a polycarbonate production process according to the sixth preferred embodiment of the present disclosure.

DETAILED DESCRIPTION OF THE EMBODIMENTS

Hereinafter, the present disclosure will be described in detail. It should be understood that the terms used in the specification and claims should not be limited to general and dictionary meanings, but are to be interpreted based on the meanings and concepts corresponding to technical aspects of the present disclosure based on the principle that the inventor is allowed to define terms in order to explain their own invention in the best way.

Also, as used herein, the meaning of "comprising", "including", or "having" embodies specific features, regions, integers, steps, operations, elements, and/or components, and does not exclude the presence or addition of other features, regions, integers, steps, operations, elements, and/or components.

Hereinafter, the method for treating a solvent in wastewater generated in a polycarbonate production process according to the exemplary embodiments of the present disclosure will be described in more detail.

According to an embodiment of the present disclosure, a method for treating a solvent in wastewater is provided. The method includes the steps of: a) preparing wastewater containing water, and a solvent in a vapor state and a liquid state generated in a polycarbonate production process; b) separating the solvent by a membrane distillation method in which the wastewater is supplied to a separation membrane column having a hydrophobic porous support membrane to separate only the solvent in a vapor state of the wastewater through pores of the hydrophobic porous support membrane and transfer it to a condenser; c) condensing the separated solvent by using a condenser; and d) transferring the condensed solvent to a solvent reservoir.

As described above, in the polycarbonate production process, a large amount of wastewater containing a solvent is generated in washing and drying processes. Therefore, a method for effectively separating and recovering the solvent in wastewater is needed.

A conventional method for separating the solvent in wastewater (that is, a process for separating and recovering methylene chloride in wastewater) exists, but this method has some problems in that energy consumption is high and a large amount of wastewater is generated.

Therefore, the present disclosure is characterized by using a membrane through a membrane distillation method in order to easily separate and recover the solvent in wastewater generated in the polycarbonate production process.

The present disclosure separates the solvent used in the polycarbonate production process more easily than the conventional methods regardless of the concentration of the solvent in wastewater, so that high purity methylene chloride can be recovered and reused for the polymerization process.

Herein, the wastewater may contain a solvent in a vapor state and a liquid state used in a polycarbonate production process, and water used in a purification process of the polycarbonate. For example, methylene chloride or methylene chloride/water may be contained. Also, the wastewater may further contain a salt and a catalytic material.

More specifically, in the method of the present disclosure, the first step a) prepares wastewater containing water, and a solvent generated in a polycarbonate production process.

The wastewater may be generated through a well-known polycarbonate production process. Specifically, the wastewater may be generated in the step of purifying the polycarbonate or regenerating nitrogen gas used for drying the polycarbonate after the completion of drying the polycarbonate.

That is, once the polymerization process of the polycarbonate is completed, a reaction mixture containing byproducts, impurities, catalysts, unreacted monomers, salts, solvents, and the like as well as products may be obtained. Then, when the purification step of the reaction mixture is completed, byproducts, catalysts, and the like are removed. Therefore, wastewater containing the polycarbonate and the solvent used in the polymerization as main components is generated, and treated through a series of processes. Further, the polycarbonate is dried using an inert gas such as nitrogen. In the step of regenerating the nitrogen gas used after the drying process, wastewater containing the solvent contained in the nitrogen is generated. Thus, the wastewater may contain the solvent in a vapor state and a liquid state. Since a large amount of water is also used to remove the catalysts and impurities in addition to byproducts in the purification process of the polycarbonate, the wastewater contains water. The wastewater may further contain a catalyst, a salt, and an additive used in the polycarbonate production process.

Among them, the subject of the wastewater treatment according to the method of the present disclosure is liquid-state wastewater generated during the purification process or the drying process of the polycarbonate. More specifically, the present disclosure is to separate and recover the solvent in liquid-state wastewater (preferably, methylene chloride) by liquefying the solvent in nitrogen gas. In this method of the present disclosure, the wastewater composition before entering the membrane of the separation membrane column, which will be described later, may be selectively used. Therefore, the wastewater of the step a) may further contain a salt, a catalytic material, or a salt and a catalytic material. For example, the wastewater of the present disclosure may contain i) water, and a solvent, ii) water, a solvent, and a salt, iii) water, a solvent, and a catalytic material, or iv) water, a solvent, a catalytic material, and a salt. The solvent in wastewater of i) to iv) may include the solvent in a vapor state and in a liquid state.

Subsequently, the present disclosure carries out the step of separating the solvent by a membrane distillation method in which the wastewater is supplied to a separation membrane column having a hydrophobic porous support membrane to separate only the solvent in a vapor state of the wastewater to one side through pores of the hydrophobic porous support membrane and transfer it to a condenser.

The step b) may further include heating the wastewater before supplying it to the hydrophobic porous support membrane.

The solution after the reaction may have a temperature of higher than the boiling point of the solvent (for example, the boiling point of methylene chloride is 39.75° C.).

In this case, it is not necessary to heat the solution before the membrane distillation. However, in order to further increase the separation rate, it is possible to optionally heat the reaction solution at a temperature of higher than the boiling point. Further, the heating may also be performed when the temperature of the solution after the reaction (wastewater) is lower than the boiling point of the solvent.

In this case, the step b) may further include heating the wastewater at a temperature between the boiling point of the solvent to be separated (39.75° C.) and the boiling point of water (100° C.).

More preferably, the step b) may further include heating the wastewater at a temperature of 40 to 90° C. by supplying it to the heater before the membrane distillation. Then, the heated wastewater is supplied to a separation membrane column having a hydrophobic porous support membrane.

When the heated wastewater is supplied to the separation membrane column, placing the porous support membrane in the center, only the solvent in a vapor state of the heated wastewater at one side is separated to the lower part of the separation membrane column.

Therefore, according to the first preferred embodiment, when water and the solvent are contained in wastewater, the solvent in a vapor state separated in the separation membrane column is transferred to a condenser through a transfer line connected to the lower part of the column, condensed, and then transferred to a solvent reservoir when the condensation to the liquid state is completed. At this time, the solvent separated by a vacuum pump may be transferred to the condenser (FIG. 1).

When the wastewater used in the present disclosure further contains a salt, a catalytic material, or a salt and a catalytic material in addition to water and the solvent, the components separated in the separation membrane may be different.

According to the second preferred embodiment, when the wastewater of the step a) further contains a salt, the step of separating the solvent by a membrane distillation method may include supplying wastewater containing water, a salt, and a solvent in a vapor state and a liquid state to a separation membrane column having a hydrophobic porous support membrane to separate only the solvent in a vapor state of the wastewater to one side through pores of the hydrophobic porous support membrane and transfer it to a condenser. In addition, water and the salt may be separated to another side. In this case, the process may be carried out as shown in FIG. 2.

According to the third preferred embodiment, when the wastewater of the step a) further contains a catalytic material, the step of separating the solvent by a membrane distillation method may include supplying wastewater containing water, a catalytic material, and a solvent in a vapor state and a liquid state to a separation membrane column having a hydrophobic porous support membrane to separate only the solvent in a vapor state of the wastewater to one side through pores of the hydrophobic porous support membrane and transfer it to a condenser (FIG. 3).

According to the fourth preferred embodiment, when the wastewater of the step a) further contains a catalytic material, the step of separating the solvent by a membrane distillation method may include supplying wastewater containing water, a catalytic material, and a solvent in a vapor state and a liquid state to a separation membrane column having a hydrophobic porous support membrane to separate the catalytic material and the solvent in a vapor state of the wastewater to one side through pores of the hydrophobic porous support membrane and transfer them to a condenser. In this case, water may be separated to another side of the separation membrane (FIG. 4).

According to another preferred embodiment, when the wastewater of the step a) further contains a catalytic material, the step of separating the solvent by a membrane distillation method may include separating some of the catalytic material together with the solvent in a vapor state in the separation membrane column. Further, as the amount of water in wastewater increases, the amount of the solvent and the moving catalyst can be further reduced. For example, in this case, at least about 20 wt % of the catalyst based on the weight of the total catalytic material contained in wastewater may be separated together with the solvent. Preferably, about 20 wt % to about 90 wt %, about 20 wt % to about 80 wt %, or about 20 wt % to about 60 wt % of the catalytic material, based on the weight of the total catalytic material contained in wastewater, may be transferred through the separation membrane with the solvent. Therefore, the step of separating the solvent by a membrane distillation method may include supplying wastewater containing water, a catalytic material, and a solvent in a vapor state and a liquid state to a separation membrane column having a hydrophobic porous support membrane to separate only about 20 wt % to 90 wt % of the catalytic material, based on the weight of the total catalyst contained in wastewater, together with the solvent in a vapor state to one side through pores of the hydrophobic porous support membrane and transfer them to a condenser. In this case, the process may be carried out as shown in FIG. 4, and water may be separated to another side of the separation membrane.

According to the fifth preferred embodiment, the step of separating the solvent by a membrane distillation method may include supplying wastewater containing water, a salt, a catalytic material, and a solvent in a vapor state and a liquid state to a separation membrane column having a hydrophobic porous support membrane to separate only the solvent in a vapor state of the wastewater to one side through pores of the hydrophobic porous support membrane and transfer it to a condenser. In this case, water, the catalytic material, and the salt may be separated to another side of the separation membrane (FIG. 5).

According to the sixth preferred embodiment, when the wastewater of the step a) further contains a salt and a catalytic material, the step of separating the solvent by a membrane distillation method may include supplying wastewater containing water, a salt, a catalytic material, and a solvent in a vapor state and a liquid state to a separation membrane column having a hydrophobic porous support membrane to separate the catalytic material and the solvent in a vapor state of the wastewater to one side through pores of the hydrophobic porous support membrane and transfer them to a condenser. In this case, water and the salt may be separated to another side of the separation membrane (FIG. 6).

Meanwhile, the separation membrane which can be used in the present disclosure may be any separation membrane having a hydrophobic surface. The separation membrane may be a hollow fiber membrane or a flat sheet membrane, but the hollow fiber membrane may be preferably used. The material of the separation membrane may be a polymer separation membrane, an inorganic separation membrane, or an organic/inorganic composite separation membrane.

According to a preferred embodiment of the present disclosure, the separation membrane may be a separation membrane having a hydrophobic porous support membrane. The porous support membrane of the hydrophobic separation membrane may be formed of polypropylene, polyethylene, polytetrafluoroethylene (PTFE), or a hydrophobic polymer material in which polypropylene is combined with Teflon.

According to an embodiment of the present disclosure, the hydrophobic porous support membrane of the separation membrane may have a pore size of 1 μm or less, but preferably 0.05 to 1 μm, 0.05 to 0.5 μm, or 0.1 to 0.5 μm.

In this method, it is preferable for the separation membrane to have a hydrophobic porous support membrane formed of polypropylene having a pore size of 0.2 μm to 0.5 μm and a PTFE material having a pore size of 0.3 μm.

Further, in the step b), the remaining wastewater not separated through the hydrophobic porous support membrane may remain on the other side of the hydrophobic porous support membrane, and then may be discharged through a transfer line connected to a side of the separation membrane column. Such wastewater can be refined as wastewater.

Subsequently, the step of c) is performed to condense the separated solvent in a vapor state by using a condenser.

The condenser may be any condenser that is well-known in the art, and may be equipped with a chiller capable of controlling the condensation rate of the solvent.

Subsequently, the step of d) is performed to transfer the condensed solvent to a solvent reservoir.

The solvent transferred to the solvent reservoir can be recovered by a vacuum pump and reused in a polycarbonate production process.

The method for treating a solvent in wastewater according to the present disclosure will now be described with reference to the drawings.

FIGS. 1 to 6 are schematic views illustrating a method for treating a solvent in wastewater generated in a polycarbonate production process according to the first preferred embodiment to the sixth preferred embodiment of the present disclosure.

As shown in FIGS. 1 to 6, according to the present disclosure, the solvent used in a polycarbonate production process may be treated using a treatment apparatus including:

a heater for heating the wastewater containing water, and a solvent in a vapor state and a liquid state generated in a polycarbonate production process;

a separation membrane column having a hydrophobic porous support membrane for separating only the solvent in a vapor state of the wastewater heated by the heater;

a condenser equipped with a chiller for condensing the solvent separated from the separation membrane;

a solvent reservoir for recovering the solvent separated from the condenser; and a vacuum pump for recovering or circulating the solvent.

Although not shown in the drawings, the heater may have a temperature controlling system for heating the wastewater.

In addition, as described above, the wastewater for treatment in the present disclosure may contain the solvent used in the polymerization reaction, the water used in the washing of the polycarbonate solution after completion of the polymerization, the catalyst by the washing, the salt, and other impurities. In the method for treating a solvent in wastewater of the present disclosure, the wastewater before entering the membrane of the separation membrane column may contain water, the salt, and the solvent in a vapor state and a liquid state since the catalytic material is removed, or may contain water, the catalyst, the salt, and the solvent in a vapor state and a liquid state.

Therefore, when treating the solvent in wastewater, the wastewater containing water and the solvent may be introduced into the heater without a catalyst such as TEA (see FIG. 1). Herein, the wastewater without the catalyst may be used by previously removing the catalytic material from the wastewater according to a method that is well-known in the art, and the method is not particularly limited.

According to another embodiment, wastewater further containing a salt, a catalytic material, or a salt and a catalytic material in addition to the wastewater containing water and the solvent of a) may be introduced to the heater (see FIGS. 2 to 6).

In addition, the separation membrane column may be equipped with a hydrophobic separation membrane for separating the solvent in wastewater, or separating the solvent together with the catalytic material. When the wastewater doesn't contain the catalytic material, the separation membrane column may be transferred to the condenser after separating only the solvent in a vapor state as described above. In addition, when the wastewater contains the catalytic material, the separation membrane column may separate the solvent in a vapor state together with the catalytic material through pores of the hydrophobic porous support membrane and transfer them to the condenser.

Additionally, a line may be provided at the bottom of the separation membrane column for separating the solvent or a mixture of the solvent and the catalytic material in wastewater, and then transferring it to the condenser. Further, a line may be provided at the side of the separation membrane column for discharging the remaining wastewater component (for example, wastewater containing water, or water and the salt) after the solvent or the mixture of the solvent and the catalytic material in wastewater is separated. Optionally, when the waste water containing water and the catalytic material is discharged to the side of the separation membrane column, a device for separating the catalytic material in wastewater may be additionally connected to the separation membrane column (see FIG. 3). For reference, CW in FIG. 3 means chilling water.

In addition, a vacuum pump may be connected between the separation membrane column and the condenser. The vacuum pump is a means for supplying the solvent discharged from the separation membrane column to the condenser and the solvent reservoir. Herein, the solvent reservoir may include a solvent drum or a solvent mixture storage tank.

For example, as shown in FIGS. 1 and 2, when only the solvent in a vapor state of the wastewater is separated to one side of the hydrophobic porous support membrane, the condenser and the solvent drum may be connected. Herein, when TEA is included in wastewater as shown in FIGS. 3 to 6, the catalytic material may be optionally removed by a catalytic material separator, which is additionally connected to the solvent mixture storage tank.

Moreover, as shown in FIGS. 4 and 5, when the catalytic material and the solvent in wastewater are separated from the separation membrane column, the condenser and the solvent mixture storage tank may be connected. In addition, as TEA is a catalytic material used in the reaction is not a salt, it doesn't matter if the wastewater introduced in a solution state in which MC and TEA are present together, pass through the separation membrane, and then transferred to the MC storage tank. Thus, MC and TEA do not have to be separated, and the catalytic material (i.e., TEA) may be optionally separated by a catalytic material separator which is additionally connected to the solvent mixture storage tank.

Meanwhile, in an embodiment of the present disclosure, the polycarbonate may be a homopolymer or a copolymer having a carbonate repeating unit represented by the following Chemical Formula 1.

[Chemical Formula 1]

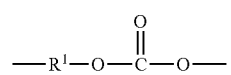

In Chemical Formula 1, R1 may be derived from an aromatic dihydroxy compound represented by the following Chemical Formula 2 or a dihydroxy compound represented by the following Chemical Formula 3 such as bisphenol.

[Chemical Formula 2]

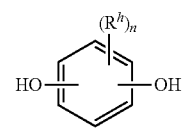

In Chemical Formula 2, $R^h$ is independently a halogen atom, a $C_{1-10}$ alkyl substituted or unsubstituted with a halogen atom, or a $C_{6-10}$ aryl substituted or unsubstituted with a halogen atom, and n is an integer of 0 to 4.

[Chemical Formula 3]

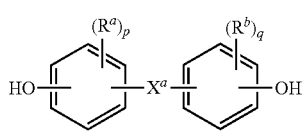

In Chemical Formula 3, $R^a$ and $R^b$ are independently halogen, a $C_{1-12}$ alkoxy or a $C_{1-12}$ alkyl, p and q are independently an integer of 0 to 4, and when p or q is less than 4, each carbon valence of the ring can be filled with hydrogen, $X^a$ is a linking group connecting two hydroxy-substituted aromatic groups, and is —O—, —S—, —S(O)—, —S(O)$_2$—, —C(O)—, or a $C_{1-18}$ organic group, wherein the $C_{1-18}$ organic group may be a substituted or unsubstituted $C_{2-18}$ cycloalkylidene, a $C_{1-25}$ alkylidene of —C($R^c$)($R^d$)— (wherein $R^c$ and $R^d$ are independently hydrogen, a $C_{1-12}$ alkyl, a $C_{1-12}$ cycloalkyl, a $C_{7-12}$ arylalkyl, a $C_{1-12}$ heteroalkyl, or a $C_{7-12}$ heteroarylalkyl), or —C(=$R^e$) (wherein $R^e$ is a divalent $C_{1-12}$ hydrocarbon).

The dihydroxy compound may be bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, α,α'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl) hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexadione, ethylene glycol bis(4-hydroxyphenyl)ether, bis(4-hydroxyphenyl)ether, bis(4-hydroxyphenyl)sulfide, bis(4-hydroxyphenyl) sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane (spirobiindane bisphenol), 3,3-bis(4-hydroxyphenyl)phthalimide, 2,6-dihydroxydibenzo-p-dioxin, 2,6-dihydroxythianthrene, 2,7-dihydroxyphenoxathine, 2,7-dihydroxy-9,10-dimethylphenazine, 3,6-dihydroxydibenzofuran, 3,6-dihydroxydibenzothiophene, and 2,7-dihydroxycarbazole; resorcinol compounds such as 5-methyl resorcinol, 5-ethyl resorcinol, 5-propyl resorcinol, 5-butyl resorcinol, 5-t-ethyl resorcinol, 5-phenyl resorcinol, 5-cumyl resorcinol, 2,4,5,6-tetrafluoro resorcinol, and 2,4,5,6-tetrabromo resorcinol; catechol; hydroquinone; and a substituted hydroquinone such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, and 2,3,5,6-tetrabromo hydroquinone.

The organic solvent may be methylene chloride ($CH_2Cl_2$), 1,2-dichloroethane ($ClCH_2CH_2Cl$), chlorobenzene ($C_6H_5Cl$), or toluene ($C_7H_8$), and specifically methylene chloride.

The catalytic material may be triethylamine, tributylamine, N,N-diethyl-cyclohexylamine, N,N-dimethylaniline, and the like, and specifically triethylamine.

The salt may be sodium chloride, sodium carbonate, and the like.

The byproducts generated in the polycarbonate production process may be purified and removed according to a method that is well-known in the art. For example, the salt in the byproducts is highly soluble in water and can be removed by an extraction method using water.

The purification process of the polycarbonate may also include a catalyst removal process, wherein the catalyst removal process can be carried out at the same time as or prior to the byproduct removal process.

Hereinafter, preferred examples of the present invention will be described in detail. However, these examples are for illustrative purposes only, and the scope of the present invention is not intended to be limited by these examples.

Example 1

Separation Membrane Experiment on Wastewater Containing $H_2O$ and MC

The wastewater containing 97.5 wt % of $H_2O$ (DW) and 2.5 wt % of MC and generated in a drying process of a typical PC production process was tested according to the method shown in FIG. 1.

That is, when the wastewater was supplied to the apparatus shown in FIG. 1, the wastewater passed through a separation membrane column having a porous support membrane (a separation membrane of polypropylene having pores of 0.2 μm).

Of both sides of the porous support membrane, the solvent in a vapor state of the heated wastewater was separated to one side and water was separated to the other side.

The separated solvent in a vapor state was condensed by a condenser, the condensed solvent was transferred to a solvent drum, and then the solvent was recovered. The solvent transferred to the solvent drum was recycled to the polycarbonate production process by a vacuum pump.

The results of the solvent content in wastewater over time are shown in Table 1 below.

TABLE 1

| Time (min) | MC content (wt %) |
| --- | --- |
| 0 | 2.50 |
| 10 | 1.00 |
| 20 | 0.25 |
| 30 | 0.00 |

Referring to Table 1, it was confirmed that the solvent content in wastewater decreased over time, and the solvent was not included in wastewater after 30 minutes. As a result of analyzing the content of the components in the MC tank, it was confirmed that the MC recovery rate relative to the input was virtually 100% since the result was 99.4 wt % of MC and 0.6 wt % of water (DW).

Example 2

Separation Membrane Experiment on Wastewater Containing $H_2O$, MC, and Salts

The wastewater containing $H_2O$ (DW), MC, and salts (NaCl, $Na_2CO_3$, and $NaHCO_3$) as shown in Table 2 and generated in a drying process of a typical PC production process was tested according to the method shown in FIG. 2.

TABLE 2

| Component | Content (wt %) |
|---|---|
| DW | 89.5 |
| MC | 2.5 |
| NaCl | 6.0 |
| $NaHCO_3$ | 1.0 |
| $Na_2CO_3$ | 1.0 |
| Sum | 100.0 |

The structure of the separation membrane was the same as in Example 1, and the results of the solvent content in wastewater separated through the apparatus of FIG. 2 over time are shown in Table 3.

TABLE 3

| Time (min) | MC content (wt %) |
|---|---|
| 0 | 2.50 |
| 10 | 0.53 |
| 20 | 0.25 |
| 30 | 0.16 |
| 60 | 0.00 |

Referring to Table 3, it was confirmed that the solvent content in wastewater decreased over time, and the solvent was not included in wastewater after 60 minutes. As a result of analyzing the content of the components in the MC tank, it was confirmed that the MC recovery rate relative to the input was virtually 100% since the result was 99.6 wt % of MC and 0.4 wt % of water (DW).

Example 3

Separation Membrane Experiment on Wastewater Containing $H_2O$, MC, and TEA (when TEA does not Move with MC)

The wastewater containing 97.1 wt % of $H_2O$ (DW), 2.5 wt % of MC, and 0.4 wt % of TEA and generated in a drying process of a typical PC production process was tested according to the method shown in FIG. 3. Herein, a separation membrane column with a separation membrane of PTFE having pores of 0.3 μm was used.

The structure of the separation membrane was the same as in Example 1, and the results of the solvent content in wastewater separated through the apparatus of FIG. 3 over time are shown in Table 4.

TABLE 4

| Time (min) | MC content (wt %) |
|---|---|
| 0 | 2.5 |
| 10 | 0.72 |
| 20 | 0.33 |
| 30 | 0.21 |
| 60 | 0.00 |

As a result of analyzing the content of the components in the MC tank, it was confirmed that the MC recovery rate relative to the input was virtually 100% since the result was 99.6 wt % of MC and 0.4 wt % of water (DW).

Example 4

Separation Membrane Experiment on Wastewater Containing $H_2O$, MC, and TEA (when TEA Moves with MC)

The experiment was conducted for the case where TEA and MC move together through the separation membrane from the wastewater containing the same components as those of the Example 3 and generated in a drying process of a typical PC production process. That is, the wastewater containing 97.1 wt % of $H_2O$ (DW), 2.5 wt % of MC, and 0.4 wt % of TEA was tested according to the method shown in FIG. 4.

The structure of the separation membrane was the same as in Example 1, and the results of the solvent content in wastewater separated through the apparatus of FIG. 4 over time are shown in Table 5.

TABLE 5

| Time (min) | MC content (wt %) |
|---|---|
| 0 | 2.5 |
| 10 | 0.49 |
| 20 | 0.30 |
| 30 | 0.15 |
| 60 | 0.00 |

As a result of analyzing the content of the components in the MC tank, it was confirmed that the MC recovery rate relative to the input was virtually 100% since the result was 99.2 wt % of MC, 0.4 wt % of TEA, and 0.4 wt % of water (DW).

Example 5

Separation Membrane Experiment on Wastewater Containing $H_2O$, MC, Salts, and TEA (when TEA does not Move with MC)

The wastewater containing $H_2O$ (DW), MC, salts (NaCl, $Na_2CO_3$, and $NaHCO_3$), and TEA as shown in Table 6 and generated in a drying process of a typical PC production process was tested according to the method shown in FIG. 5.

TABLE 6

| Component | Content (wt %) |
|---|---|
| DW | 89.1 |
| MC | 2.5 |
| NaCl | 6.0 |
| $NaHCO_3$ | 1.0 |
| $Na_2CO_3$ | 1.0 |
| TEA | 0.4 |
| Sum | 100.0 |

The structure of the separation membrane was the same as in Example 1, and the results of the solvent content in wastewater separated through the apparatus of FIG. 5 over time are shown in Table 7.

TABLE 7

| Time (min) | MC content (wt %) |
|---|---|
| 0 | 2.50 |
| 10 | 0.53 |
| 20 | 0.25 |
| 30 | 0.16 |
| 60 | 0.00 |

Referring to Table 7, it was confirmed that the solvent content in wastewater decreased over time, and the solvent was not included in wastewater after 60 minutes. As a result of analyzing the content of the components in the MC tank, it was confirmed that the MC recovery rate relative to the input was virtually 100% since the result was 99.6 wt % of MC and 0.4 wt % of water (DW).

Example 6

Separation Membrane Experiment on Wastewater Containing $H_2O$, MC, Salts, and TEA (when TEA Moves with MC)

The experiment was conducted on the case where TEA and MC move together through the separation membrane from the wastewater containing the same components as that of the Example 3 and generated in a drying process of a typical PC production process. That is, the composition of the wastewater is shown in Table 7 above.

The structure of the separation membrane was the same as in Example 1, and the results of the solvent content in wastewater separated through the apparatus of FIG. 6 over time are shown in Table 8.

TABLE 8

| Time (min) | MC content (wt %) |
|---|---|
| 0 | 2.5 |
| 10 | 0.46 |
| 20 | 0.27 |
| 30 | 0.09 |
| 60 | 0.00 |

As a result of analyzing the content of the components in the MC tank, it was confirmed that the MC recovery rate relative to the input was virtually 100% since the result was 99.2 wt % of MC, 0.4 wt % of TEA, and 0.4 wt % of water (DW).

What is claimed is:

1. A method for treating a solvent in wastewater, comprising steps of:
   a) preparing the wastewater containing water, and a solvent in a vapor state and a liquid state generated in a polycarbonate production process;
   b) separating the solvent by a membrane distillation method in which the wastewater is supplied to a separation membrane column having a hydrophobic porous support membrane to separate only the solvent in a vapor state through pores of the hydrophobic porous support membrane and transfer it to a condenser;
   c) condensing the separated solvent by using the condenser; and
   d) transferring the condensed solvent to a solvent reservoir,
   wherein the hydrophobic porous support membrane has pores of a 0.2 µm to 0.5 µm size, and is formed of polypropylene or polytetrafluoroethylene (PTFE), and wherein the solvent is methylene chloride ($CH_2Cl_2$).

2. The method of claim 1,
   wherein the wastewater of the step a) further contains a salt, a catalytic material, or a salt and a catalytic material.

3. The method of claim 2,
   wherein, when the wastewater of the step a) further contains the salt, the step of separating the solvent by a membrane distillation method comprises
   supplying the wastewater containing water, a salt, and a solvent in a vapor state and a liquid state to the separation membrane column having a hydrophobic porous support membrane to separate only the solvent in a vapor state to one side through the pores of the hydrophobic porous support membrane and transfer it to the condenser.

4. The method of claim 2,
   wherein, when the wastewater of the step a) further contains the catalytic material, the step of separating the solvent by a membrane distillation method comprises
   supplying the wastewater containing water, a catalytic material, and a solvent in a vapor state and a liquid state to the separation membrane column having a hydrophobic porous support membrane to separate only the solvent in a vapor state to one side through the pores of the hydrophobic porous support membrane and transfer it to the condenser.

5. The method of claim 2,
   wherein, when the wastewater of the step a) further contains the catalytic material, the step of separating the solvent by a membrane distillation method comprises
   supplying the wastewater containing water, a catalytic material, and a solvent in a vapor state and a liquid state to the separation membrane column having a hydrophobic porous support membrane to separate the catalytic material and the solvent in a vapor state to one side through the pores of the hydrophobic porous support membrane and transfer them to the condenser.

6. The method of claim 2,
   wherein, when the wastewater of the step a) further contains the catalytic material, the step of separating the solvent by the membrane distillation method comprises
   supplying the wastewater containing water, a catalytic material, and a solvent in a vapor state and a liquid state to the separation membrane column having a hydrophobic porous support membrane to separate only 20 wt % to 90 wt % of the catalytic material, based on the weight of the total catalyst contained in the wastewater, together with the solvent in a vapor state to one side through the pores of the hydrophobic porous support membrane and transfer them to the condenser.

7. The method of claim 2,
   wherein, when the wastewater of the step a) further contains the salt and the catalytic material, the step of separating the solvent by the membrane distillation method comprises
   supplying the wastewater containing water, a salt, a catalytic material, and a solvent in a vapor state and a liquid state to the separation membrane column having a hydrophobic porous support membrane to separate the catalytic material and the solvent in a vapor state to one side through the pores of the hydrophobic porous support membrane and transfer them to the condenser.

8. The method of claim 2,
wherein, when the wastewater of the step a) further contains the salt and the catalytic material, the step of separating the solvent by the membrane distillation method comprises
supplying the wastewater containing water, a salt, a catalytic material, and a solvent in a vapor state and a liquid state to the separation membrane column having a hydrophobic porous support membrane to separate only the solvent in a vapor state to one side through the pores of the hydrophobic porous support membrane and transfer it to the condenser.

9. The method of claim 1,
wherein, in the step a), the wastewater is generated in the step of purifying the polycarbonate or regenerating nitrogen gas used for drying the polycarbonate after completion of drying.

10. The method of claim 1,
wherein the step b) further comprises heating the wastewater before supplying it to the hydrophobic porous support membrane.

11. The method of claim 1,
wherein, in the step b), the remaining wastewater not separated through the hydrophobic porous support membrane remains on the other side of the hydrophobic porous support membrane, and then is discharged through a transfer line connected to a side of the separation membrane column.

12. The method of claim 1,
wherein the solvent separated in the step c) is recovered and reused in the polycarbonate production process.

13. The method of claim 1, wherein the solvent in the wastewater is treated using a treatment apparatus comprising:
   a heater for heating the wastewater containing water, and a solvent in a vapor state and a liquid state generated in a polycarbonate production process;
   the separation membrane column having the hydrophobic porous support membrane for separating only the solvent in a vapor state heated by the heater;
   the condenser equipped with a chiller for condensing the solvent separated from the separation membrane;
   the solvent reservoir for recovering the solvent separated from the condenser; and
   a vacuum pump for recovering or circulating the solvent.

* * * * *